United States Patent [19]
Pelletier

[11] 3,902,752
[45] Sept. 2, 1975

[54] BUMPER APRON
[76] Inventor: Maurice Pelletier, 8370 Place Montrichard, Ville D'Anjou, Quebec, Canada
[22] Filed: Nov. 30, 1973
[21] Appl. No.: 420,714

[52] U.S. Cl............................... 296/91; 280/150 R
[51] Int. Cl............................................. B60j 11/00
[58] Field of Search.................... 296/91; 280/150 R

[56] References Cited
UNITED STATES PATENTS
2,919,141  12/1959  Hughes ............................ 280/150 R
3,170,714  2/1965  Stalker............................ 280/150 R FOREIGN PATENTS OR APPLICATIONS
1,905,131  8/1970  Germany......................... 280/150 R Primary Examiner—Robert J. Spar
Assistant Examiner—Ross Weaver

[57] ABSTRACT

The invention consists of a bumper apron unit for automobile trunks to protect the clothes when loading or unloading items, in which the apron is foldable in accordion shape and fits in a carrier connected to the trunk wall, to prevent it from taking up space on the trunk floor and from becoming unfolded and getting dirty.

2 Claims, 4 Drawing Figures

PATENTED SEP 2 1975 3,902,752
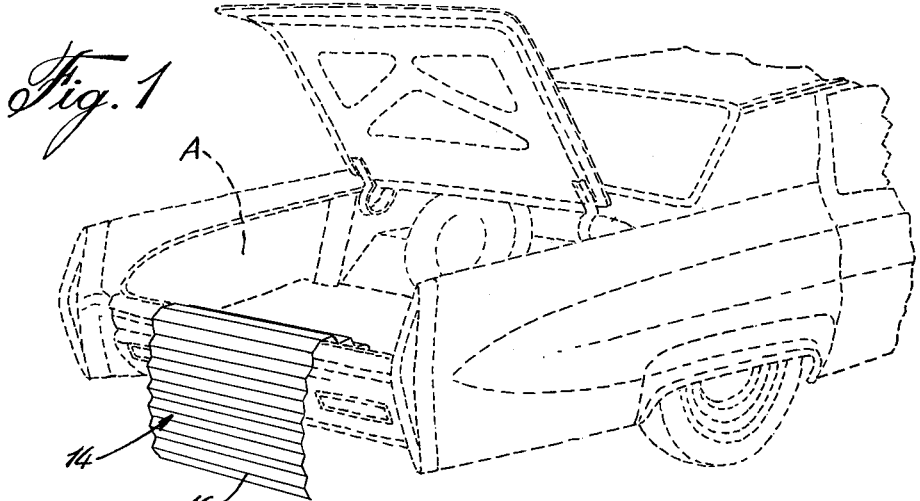
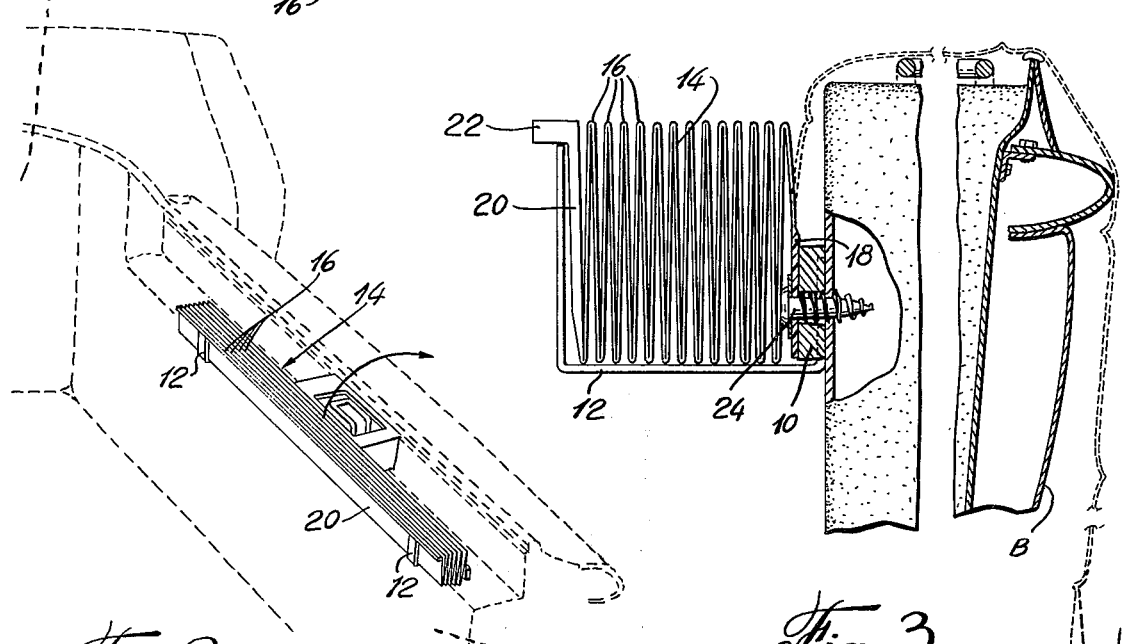
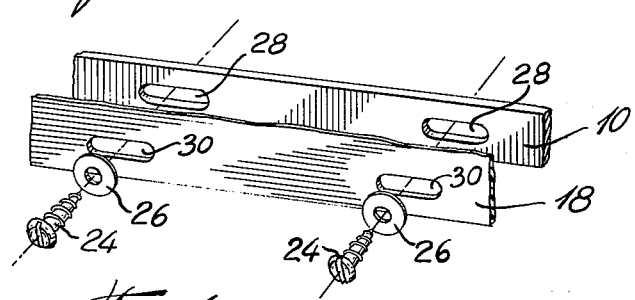

BUMPER APRON

The present invention relates to a bumper apron unit for use in connection with automobile trunks.

In the normal use of an automobile the bumper and other parts of the body adjacent the trunk opening become coated with road dirt. When items are loaded or unloaded the legs are often brushed or leaned against the bumper resulting in the clothes getting dirty. This is particularly the case with the larger vehicles of recent make, in which the trunk extends forward quite a way into the automobile.

Because of the wide bumpers currently fashionable the edge of the trunk in some models is quite high, so that even the upper clothing may come in contact with dirt carrying surfaces.

Bumper aprons are known, which are secured at one end to the rear inside wall of the trunk and can be spread over the bumper and adjacent surfaces to protect the clothes, when it is desired to load or unload the trunk. When not in use the apron is folded and laid on the floor of the trunk. This arrangement has certain drawbacks. One is that the apron may get dirty from contact with the trunk floor. Another drawback is that it takes up floor space. Furthermore some items may be placed over the apron causing wear and tear on it.

The present invention obviates these disadvantages by providing a bumper apron unit for automobile trunks, comprising a carrier fastenable to the inside rear wall of an automobile trunk and an apron having an end secured to the carrier and receivable in the carrier in folded condition.

It will be seen that with this arrangement the apron is kept in folded and protected condition by the carrier and does not take up any space on the floor of the trunk.

Further according to the invention the apron is of sheet material with permanent folds therein to assume an accordion shape and has a stiffer outer marginal portion of the same width as the spacing between successive folds, which facilitates the folding operation and aids in retaining the apron in neatly folded condition.

Still according to the invention the carrier comprises a rear slat fastenable to the automobile trunk wall and a pair of spaced L-shaped brackets secured to the slat, and the apron has a stiffer inner marginal portion adjacent the slat so that both apron and carrier may be mounted as a unit in a single operation and may be placed as close as desired to the upper edge of the rear inside trunk wall, even if the surface of the wall is not flat and continuous.

A preferred embodiment of the invention is illustrated by way of example in the accompanying drawings, in which FIG. 1 is a perspective view of the bumper apron unit in unfolded condition.

FIG. 2 is a perspective view of the bumper apron unit in folded condition.

FIG. 3 is a cross-section of the unit in folded condition.

FIG. 4 is a perspective detail view showing the attachment of the unit to the trunk wall.

Referring to the drawings the bumper apron unit according to the invention comprises a carrier consisting of a rear slat 10 to which are secured a pair of spaced, forwardly projecting L-shaped brackets 12, and an apron 14 consisting of a sheet of flexible material, preferably plastic, with permanent folds 16 built in it and going in opposite directions.

One end of apron 14 is formed with a stiffer marginal portion 18 of a width generally equal to the slat 10 while the other end of apron 14 has a stiffer marginal portion 20 of a width equal to the spacing between successive folds 16, as well as a flange 22 projecting at right angles to the portion 20.

To install the unit the marginal portion 18 of the apron is superposed on the slat 10, which is of the same width as the apron 14, and both portion 18 and slat 10 are secured to the rear inside wall, indicated at W in dotted lines, of the trunk of the automobile, indicated at A in dotted lines, by means of sheet metal screws 24, provided with washers 26, and passing through slots 28 and 30 of the slat 10 and marginal portion 18.

In use the apron 14 is stretched and draped over the bumper indicated at B in FIG. 3. When it is no longer needed the apron 14 is folded accordion-fashion, conveniently by holding the successive folds against the outer marginal portion 20, and is then tucked into the brackets 12.

The flange 22 can be grasped with the fingers to facilitate removal of the apron 14 from the brackets 12.

I claim:

1. In an automobile having a trunk compartment defined in part by an upstanding rear wall, the improvement comprising:

generally L-shaped rigid upwardly open carrier bracket means secured to said rear wall, adjacent the upper edge thereof;

a bumper apron of thin foldable material having one end thereof secured to said rear wall within said bracket means and being folded in accordion folds with permanent creases therein and seated in said bracket means with the folds thereof extending generally vertical and parallel to said rear wall; and the other end of said apron comprising a substantially rigid planar end fold having a stiff upper edge portion comprising a narrow flange extending laterally of the plane of said end fold and defining a hand grip whereby said apron may be removed from said bracket by pulling upwardly on said flange and may be readily folded for replacement due to the permanent creases therein.

2. A device as defined in claim 1 wherein said end one of said folds is of thicker material than the other folds.

* * * * *